Sept. 19, 1967     D. H. MARGOLIEN     3,342,107
ELONGATED STOCK CUTTING APPARATUS
Original Filed Sept. 1, 1964
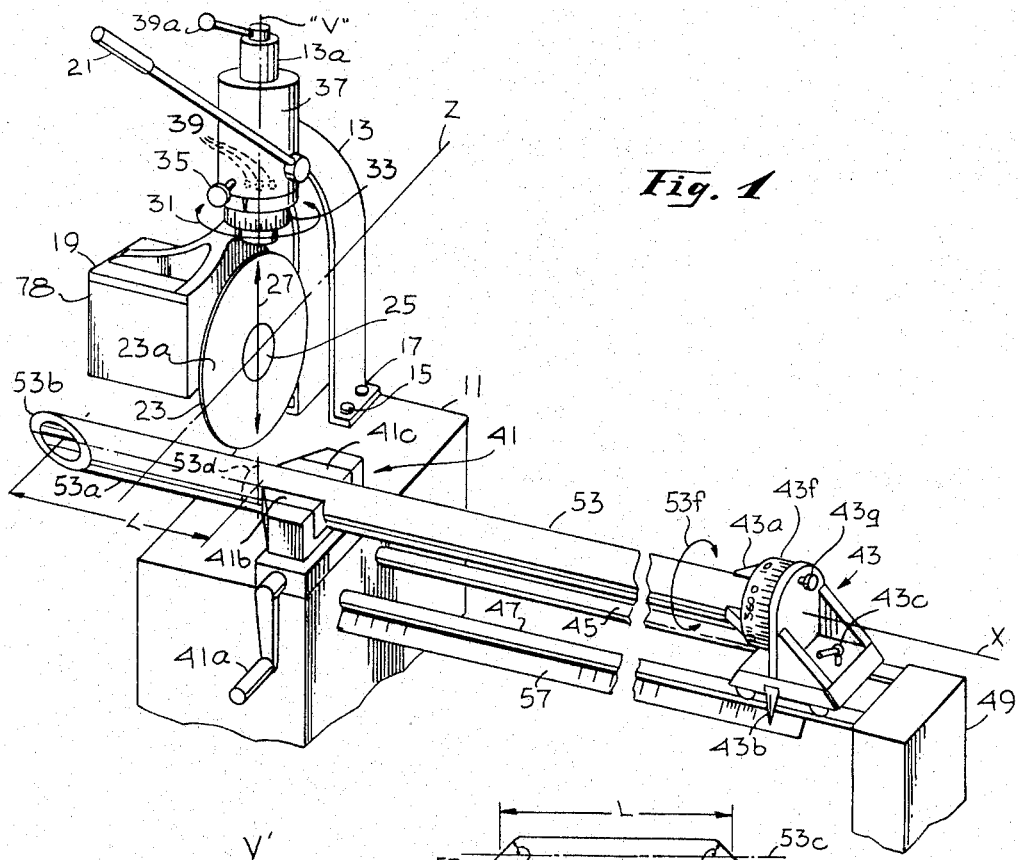
Fig. 1
Fig. 2
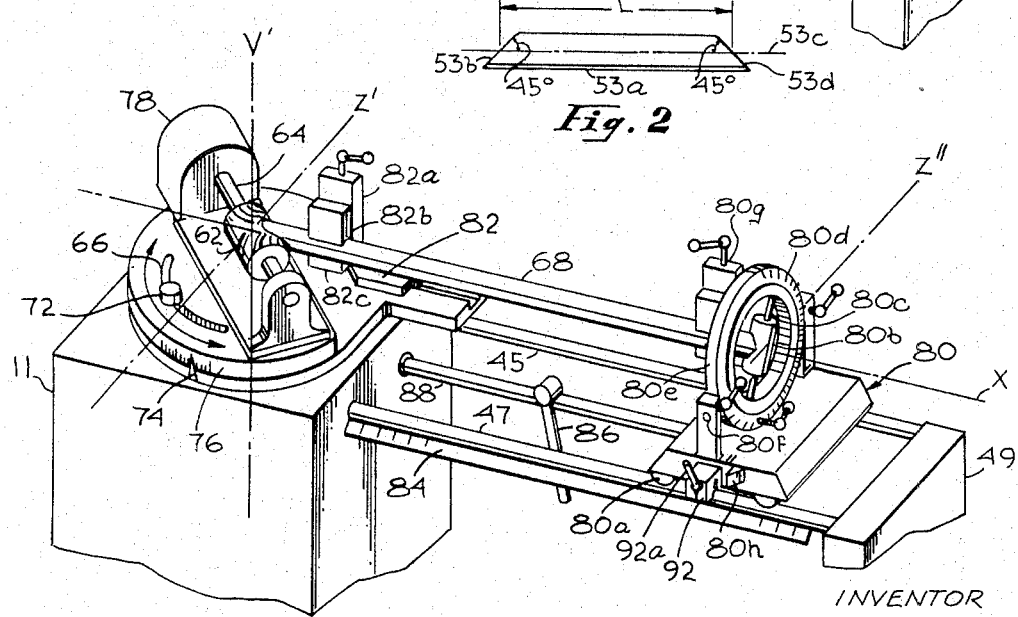
Fig. 3
INVENTOR
DAVID H. MARGOLIEN
BY
ATTORNEYS

United States Patent Office 3,342,107
Patented Sept. 19, 1967

3,342,107
ELONGATED STOCK CUTTING APPARATUS
David H. Margolien, 23206 Hatteras St.,
Woodland Hills, Calif. 91364
Original application Sept. 1, 1964, Ser. No. 393,582, now Patent No. 3,263,544, dated Aug. 2, 1966. Divided and this application Aug. 23, 1965, Ser. No. 481,610
6 Claims. (Cl. 90—17)

This invention relates to a power cutter and, more particularly, to an improved power precision cutting apparatus.

This is a divisional application of an original application, Ser. No. 393,582, filed Sept. 1, 1964 now Patent No. 3,263,544 issued Aug. 2, 1966.

A number of power cutting machines which are especially useful for cutting off ends of material at desired angles are at present commercially available. The cutting capabilities and capacities as well as the accuracy with which the cutting operations are performed by such machines vary greatly. Although a number of known machines perform with varying degrees of success, they require skilled operators for their operation. For example, in cutting relatively large and heavy parts, such as steel bars or slabs, each part to be cut must first be placed on a support structure and then the cutting assembly with the cutting member of machine is positioned in relation to the particular position of the part to be cut on the support structure, so that the part may be cut about the desired surface and at the desired angle. Such a machine requires highly skilled labor since the cutting member has to be precisely positioned anew for each part to be cut.

In other known machines which are used to cut relatively smaller and lighter parts, the position of the cutting assembly is usually fixed with respect to the rest of the machine's structure. The desired cutting operation is performed by the operator positioning each part to be cut with respect to the cutting member. Although such machines are relatively simple to operate, they are limited in their use to nonmass production operations, since each part must be measured anew so that the cut part has the desired dimensions and shape. For example, in using such a machine to cut several pieces of elongated stock such as pipes, to a desired given length, the operator of the machine usually measures each piece of pipe in order to determine the necessary condition of the pipe with respect to the machine's cutting member so that each cut piece will be of the desired length. Such an operation is further complicated if one or more of the ends of a cut pipe is to form an angle other than a right angle with the longitudinal axis of the pipe and still maintain an accurate control over its length.

It is therefore an object of the present invention to provide an improved cutting apparatus which eliminates some of the indicated disadvantages of prior art machines.

Another object of the present invention is the provision of an improved power cutting apparatus in which the positions of specific structural features are interrelated to provide simple cutting operations.

Still another object of this invention is the provision of a precision power cutting apparatus with simple operational controls so that it may be used satisfactorily by relatively unskilled labor.

It is still a further object of the present invention to provide a power cutting apparatus which includes a novel support structure and measuring arrangement so that the speed and precision of the cutting operation are greatly increased.

These and other objects of this invention may be achieved by employing a cutting apparatus in which a central axis of the material to be cut, such as the longitudinal axis of elongated stock, is maintained perpendicular with respect to a central line across the surface of a cutting member, irrespective of the angle formed between the surface of the cutting member and the longitudinal axis of the material to be cut.

In one embodiment of the present invention, the cutting apparatus comprises a cutting assembly and a cutting member such as a circular saw blade which are adapted to travel vertically about a vertical axis. The cutting assembly including the saw blade is also rotatable about the vertical axis so that the surface of the cutting blade including the center of the blade is at all times aligned with the vertical axis. The cutting apparatus also includes a support frame for releasably clamping the elongated material to be cut with its longitudinal axis perpendicular to the vertical axis and aligned with the center of the saw blade.

The angle at which the end of the elongated stock is cut is easily controlled by rotating the cutting saw blade about the vertical axis until the cutting surface of the blade is at the desired angle with respect to the longitudinal axis of the elongated stock. The cutting apparatus of the invention also provides a scale for convenient display of the length of the elongated stock along its longitudinal axis from a point of intersection of the axis with the cutting blade. Another scale is provided to display the angle between the surface of the cutting blade and the longitudinal axis of the elongated stock.

The novel features that are considered characteristic of this invention are set forth with particularity in the appended claims. The invention itself both as to its organization and method of operation, as well as additional objects and advantages thereof, will best be understood from the following description when read in connection with the accompanying drawings in which:

FIGURE 1 is an isometric view of one embodiment of the present invention;

FIGURE 2 is a plan elevational view of a part to be cut in accordance with the teachings of the present invention; and FIGURE 3 is an isometric view of another embodiment of the invention.

Reference is now made to FIGURE 1 which shows an isometric view of one embodiment of the improved cutoff apparatus of the present invention. As seen therein, the apparatus comprises a main structure 11 on which a cutting assembly support frame 13 is secured by means of bolts 15 and 17. A portion of the support frame 13 houses a shaft 13a vertically disposed about a vertical axis designated V on which a cutting assembly 19 is mounted. The assembly is vertically movable about the V axis, downward vertical travel being actuated by means of a hand lever 21. The cutting assembly 19 includes a cutting member, such as a cutting wheel 23, mounted on a shaft 25 which supplies rotary motion to the wheel 23 from a source of power such as a conventional motor generally designated by reference numeral 78.

The cutting assembly 19 is positioned on the shaft 13a so that the center of the wheel 23 and a central line diametrically drawn across the surface 23 thereof such as a center line 27 shown in FIGURE 1, are at all times aligned with the vertical axis V. The entire cutting assembly 19 including the cutting wheel 23 are also rotatably or pivotally mounted on the shaft 13a so that the wheel 23 may rotate or pivot about V axis, as indicated by a double arrow 31. However, irrespective of the rotational position of the wheel 23 about the V axis, the central line thereof is at all times aligned with such axis. The rotational position of the cutting surface 23a of the wheel 23 is calibrated as a function of an angle between the surface 23a and zero reference plane VZ, such plane being defined by an axis Z perpendicular to the previously referred to V axis. Thus, when the surface 23a is in the VZ plane, the rotational position of surface is deemed to be zero which is conveniently indicated on an angle readout scale 33 shown in FIGURE 1 as part of the cutting assembly 19. The cutting assembly with the wheel 23 thus may be rotated so that the surface 23a forms any desired angle with respect to the plane VZ, such angle being conveniently read off the scale 33. The cutting surface 23a may be fixed at such an angle by releasably clamping the assembly 19 by conventional means, diagrammatically shown in FIGURE 1 as a bolt 35 inserted through a stationary housing 37 into a desired one of a plurality of positioning holes 39. Angular positions, other than those provided by the positioned holes 39, may be obtained by means of a locking lever 39a.

In addition to controlling the precise position of the surface 23a of the cutting wheel 23, so that the central line 27 is at all times aligned with the V axis irrespective of the vertical movements of the cutting surface or the rotational position thereof about the VZ plane, the present invention also provides a support frame for supporting the material to be cut. Such an arrangement is shown in FIGURE 1 as comprising a self-centering vise 41 and a chuck assembly 43 which is slidably mounted on a pair of ways 45 and 47 connected at one end thereof to the main structure 11, the other ends being supported by a support post 49. The ways 45 and 47 are maintained in a horizontal plane so that the centers of a self-centering chuck 43a of the slidable chuck assembly 43 and the vise 41 are aligned with a horizontal axis X which is perpendicularly oriented with respect to the V and Z axes hereinbefore described. The central line 27 of the surface 23a previously described is oriented so that it is perpendicularly oriented with respect to the X axis which it intersects as the cutting assembly 19 is moved vertically downward by means of the lever 21.

The vise 41 and the chuck assembly 43 shown in FIGURE 1 are especially useful for supporting elongated cylindrically-shaped stock, such as a pipe 53 shown in FIGURE 1 with its open end being clampedly supported by the chuck 43a and a portion of its surface adjacent to the end to be cut off, being clampedly supported by the self-centering vise 41. The longitudinal axis of the pipe 53 is substantially aligned with the X axis.

As previously explained, the center line 27 of the surface 23a is oriented so that when the cutting wheel 23 is moved downwardly, it intersects the X axis. Since the longitudinal axis of the elongated stock 53 is aligned therewith, it is seen that the center line of the cutting wheel 23 similarly intersects the central longitudinal axis of the pipe 53 which is to be cut. Such an arrangement provides a most convenient reference point along the longitudinal axis of the pipe, since the desired length of the pipe to be cut may be measured along its longitudinal axis from such reference point.

As seen from FIGURE 1, the length of the pipe 53, projecting beyond the cutting wheel 23 towards the pipe's open end which is clamped in the chuck 43a may be controlled by merely releasing, by means of a vise handle 41a, vise jaws 41b and 41c from clamping the pipe 53 and then sliding the chuck assembly 43 on the sliding ways 45 and 47 to a selected point. The point is selected so that the total length of the pipe along its longitudinal axis from the open end clamped in the chuck 43a to the point of intersection of the axis with the center line 27 of the cutting surface 23a equals the desired length. The present invention greatly simplifies the measurements necessary to insure that the cut elongated stock be of a desired length. This is accomplished by providing a direct reading scale 57 shown in FIGURE 1 mounted on the sliding way 47. This scale is calibrated so that the position of a pointer 43b, fixed to the chuck assembly 43 with respect to the markings on the scale 57, provides a visual reading of the exact distance between a surface within the chuck assembly 43 against which the open end of the pipe 53 abuts, and the point of intersection of the longitudinal axis of the pipe 53 and the central line 27 of the cutting wheel 23. Thus, knowing the desired length of an elongated cylindrical part along its longitudinal axis, the pointer 43b of the chuck assembly is positioned with respect to the scale 57 so that the desired length is indicated thereon. Thereafter, the chuck assembly may be releasably fastened at the desired position by means of a bolt 43c which is tightened against the way 45. Once the chuck assembly is fastened, an elongated cylindrical part, such as the pipe 53, is inserted and clamped in the chuck 43a and the vise 41 and thereafter the cutting wheel 23 is lowered to intersect the pipe 53 and cut it at the desired length. As long as the position of the chuck assembly is not altered, all pieces inserted therein may be cut to the exact same length.

From the foregoing description, it is seen that the improved cutting apparatus of the present invention may be operated in accordance with simple operational steps. The length of cylindrically-shaped elongated stock to be cut, the length being defined along the longitudinal axis, is easily controlled by merely varying the position of the chuck assembly with respect to the direct reading scale 57 by a distance equal to the desired length.

The apparatus of the present invention is similarly operable with simple operational steps for controlling the angle at which the end of the elongated stock is cut off. As previously explained, the VZ plane is deemed as the zero reference plane for the rotational position of the cutting wheel 23. Thus, when the longitudinal axis of the elongated stock is perpendicular to such plane and the cutting wheel 23 is positioned so that its surface 23a is in the VZ plane, the reading on the angle scale 33 indicates a zero angle, thereby indicating that the angle of the elongated stock is cut off with its surface substantially perpendicular to the longitudinal axis of the stock. By controlling the rotational position of the cutting wheel 23 about the vertical V axis, the angle formed by the cutting wheel with respect to the VZ plane may be conveniently read off the scale 33, thereby indicating the angle which the cut off end makes with the longitudinal axis of the elongated stocked. The angle is conveniently controlled by merely reading off the desired angle on the scale 33 and then releasably fastening the cutting wheel 23 and the cutting assembly at such angular position.

In a preferred embodiment of the present invention, the scale 57 is used to determine length of the elongated stock projecting beyond the cutting wheel 23 rather than the length of stock between the chuck assembly 43 and the cutting wheel 23. For a better understanding of the preferred embodiment of the invention, reference is made to FIGURE 2 which is a plan elevational view of a part of elongated stock to be cut according to the teachings disclosed herein. As seen from FIGURE 2, the part 53a is to be cut so that its end faces 53b and 53d are at angles of forty-five degrees with respect to the longitudinal axis 53c, the faces being oriented to lie in planes perpendicular to one another. The length of the part 53a along its longitudinal axis is to be equal to L.

The part 53a may conveniently be cut in the embodiment of the invention shown in FIGURE 1. The elongated stock 53 is first positioned in the vise 41 and chuck assembly 43 so that its open end is adjacent the cutting wheel 23. The cutting assembly is then oriented at an angle of forty-five degrees with respect to the longitudinal axis of the stock 53 so that the end face 53b may be cut. Thereafter the chuck assembly 43 is moved towards the cutting wheel 23 a distance L, such distance being conveniently read off the scale 57. The end face 53d of the part 53a is then cut off.

The angular relationship between the longitudinal axis of the part 53a and the end face 53d may be controlled by either of two convenient techniques. The cutting assembly may be rotated by ninety degrees with respect to its position when the end face 53b was cut so that the two end faces are in planes substantially perpendicular to one another. A second technique of controlling the cutting of the end face 53d comprises of rotating the elongated stock 53 about its longitudinal axis X as indicated by an arrow 53f. This is accomplished by rotating the chuck 43a within the assembly 43 so that the stock 53 is properly oriented with respect to the cutting wheel 23 for the cutting of the end face 53d. In the foregoing example, after cutting the end face 53b and moving the assembly 43 forward by a distance L, the chuck 43a is rotated by 180° as indicated by a scale 43f on the assembly 43. The chuck 43a is then locked in by means of a locking bolt 43g and the end face 53d is cut so that the end faces 53b and 53d are in planes perpendicular to one another. This is accomplished without having to change the angular position of the cutting wheel 23.

From the foregoing description, it is seen that the length to which the elongated stock is to be cut is conveniently and simple controlled by controlling the position of the chuck assembly in relation to the markings on the direct reading scale 57, as a function of the desired length of the stock along its longitudinal axis between its two ends. Similarly, the angular relationship of the end faces of the stock to be cut with respect to one another as well as the longitudinal axis of the stock is conveniently controlled by the angular position of the cutting wheel 23 with respect to the longitudinal axis of the stock. Also, the rotational position of the stock about its longitudinal axis during the cutting of the two end faces of any desired part may be used to control the angular relationship of the end cut surfaces. Such simple operational controls enable relatively unskilled machinists to operate the apparatus of the present invention after only a brief training period.

Reference is now made to FIGURE 3 wherein another embodiment of the present invention is shown in isometric view. As seen therefrom, in the present embodiment of the invention, a milling member 62 mounted on a rotatable shaft 64 of a milling assembly 66 is used to mill radius cuts in an elongated stock such as a pipe 68. The milling assembly 66 is releasably fastened to the main frame structure 11 by means of a bolt 72 so that the longitudinal axis of the shaft 64 as well as the milling member 62, are positioned at a selected angle with respect to a zero-angle vertical reference plane V'Z' defined by mutually perpendicular axes V' and Z'. The selected angle is visually indicated by a marker 74 on angle scale 76 which performs a function similar to that performed by the scale 33 hereinbefore described in connection with FIGURE 1. Irrespective however of the angle between the reference plane V'Z' and the longitudinal axis of the milling member 62, the center point of the member 62 is positioned so as to lie at the point of intersection of the V' and Z' axes. The milling member 62 rotates about its longitudinal axis as the shaft 64 is rotated by a conventional motor generally designated by reference numeral 78.

The presently described embodiment of the invention further includes a support structure for supporting the pipe 68 so that the longitudinal axis thereof is at all times in a horizontal plane perpendicular to the vertical plane V'Z' hereinbefore referred to. The support structure shown in FIGURE 3, which is similar to the support structure described in conjunction with FIGURE 1, comprises a centering stock support assembly 80 which is slidable by means of a plurality of wheels 80a on a pair of sliding ways 45 and 47, supported on one end by the support post 49 and on the other end by the frame 11. In addition, the support structure includes a self-centering vise assembly 82, on which a self-centering vise 82a is mounted. Vise jaws 82b and 82c are used to clamp the pipe 68 near the end to be milled. The vise assembly 82 is slidably mounted on the frame 11 adjacent the milling assembly 62 so that a section of the pipe 68 near the end to be milled is supported during the milling operation.

The centering stock support assembly 80 includes in addition to the wheels 80, a self-centering chuck-like member 80b mounted on a shaft 80c which is centrally disposed in a ring 80d. The ring 80d which is coupled to the main structure of the assembly 80 by means of a shaft 80f whose longitudinal axis is aligned in a Z" axis which is at all times parallel to the Z' axis previously described. The assembly 80 which also includes a self-centering vise 80g, is operable so that the longitudinal axis of the pipe 68 having one open end thereof located in the chuck-like member 80b is oriented to be in a horizontal plane so that the longitudinal axis is perpendicular to the V'Z' plane hereinbefore described. In addition, the longitudinal axis of the pipe 68 is aligned with respect to the center line of the milling member 62 so that the end of the pipe 68 is in proper position with respect to the milling member for desired radius cuts to be milled therein.

As seen from FIGURE 3, the embodiment of the invention shown therein also includes a direct reading scale 84 which is calibrated to visually indicate distances along the longitudinal axis of the pipe 68 from a center line drawn across the center of the milling member 62 aligned with the axis V' to the axis Z". An operator may thus conveniently determine the extent of milling required with respect to the longitudinal axis of the pipe 68. Milling is accomplished by turning a hand lever 86 which is coupled to a feed shaft 88 slidably supported on one end by the frame 11, the other end thereto being connected to the assembly 80. By gradually turning the lever 86, the assembly 80, the vise assembly 82, including the pipe 68 clamped thereto, move toward the milling member 62 so that the desired radius cut may be milled therein.

The direct reading scale 84 is used by the operator to insure that the assembly is moved towards the milling member 62 only a distance sufficient for the desired radius to be milled therein. The operation of the apparatus of the present invention is further improved by providing an adjustable stop 92 which is clampable by means of a handle 92a to the sliding way 47. The adjustable stop is positioned on the way 47 so that the assembly 80 is prevented by means of a protruding bracket 80h from moving towards the milling member 62 beyond the position of the adjustable stop 92. Thus, the milled end of the pipe 68 cannot project beyond the vertical center line of the milling member 62.

In the foregoing description, the improved apparatus of the invention is described in conjunction with cutting and milling elongated pipes 53 and 68. Such description is presented for explanatory purposes only and is not intended to limit the invention to cutting or milling circularly-shaped cylindrical parts only. Rather, the invention is especially directed to cutting and milling the ends of any elongated stock within the dimensional capabilities of the apparatus. For example, rectangularly or squarely-shaped wooden or metallic bars or posts may be cut off and/or milled in accordance with the novel teachings disclosed herein.

In addition, the particular cutting wheel 23 and the milling member 62 shown in FIGURES 1 and 3 respectively are presented for explanatory purposes only. Other devices, such as a bandsaw may be used to cut off the end of elongated stock without departing from the teachings disclosed herein. Similarly, other abrasive devices having configurations other than that of the milling member 62 shown in FIGURE 3 may be used to grind or mill desired radius cuts in the elongated stock fed thereto.

Accordingly, all suitable modifications and equivalents are intended to fall within the scope of the invention as claimed.

What is claimed is:
1. An apparatus for shaping the end of elongated stock having a longitudinal axis comprising fastening means for releasably fastening said elongated stock; a shaping member having a center which is fixedly positioned in a fixed central axis of reference; and means for releasably rotating said shaping member about said fixed central axis of reference to be at a predetermined angle with respect to said longitudinal axis of said elongated stock, while maintaining said fixed central axis of reference perpendicular to said longitudinal axis and means for rotating said shaping member about a longitudinal axis thereof to shape the end of said stock when engaging the surface thereof, with said center being fixedly positioned in said fixed central axis of reference.

2. An apparatus as recited in claim 1 further including readout means; and means for mounting said readout means adjacent said fastening means to display the length of said stock along said longitudinal axis thereof from the position of the central axis at which the center of said shaping member is fixedly positioned, to an opposite end of said stock.

3. An apparatus for milling an end of elongated stock to a predetermined radial shape with respect to its longitudinal axis comprising: a milling member having a center fixedly positioned; a fixed central axis of reference; mounting means for mounting said milling member with said central axis of reference established as a vertical reference axis whereby the center of said milling member is fixed in said vertical reference axis; positioning means for positioning said elongated stock with its longitudinal axis perpendicular to said vertical reference axis and aligned with the center of said milling member; means for pivotally positioning said milling member about said vertical reference axis to mill the end of said elongated stock to said predetermined radial shape with respect to its longitudinal axis; and means for moving said positioning means towards said milling member for engaging said milling member with the end of the elongated stock to be milled, said apparatus further including means for rotating said milling member about a longitudinal axis thereof, with the center of said milling member being fixedly positioned in said vertical reference axis.

4. An apparatus as recited in claim 3 further including readout measure means; and means for attaching said readout measure means adjacent said positioning means, said readout measure means indicating the length of said elongated stock from the center of said milling member which is fixedly positioned in said vertical reference axis to an end of said stock opposite the milled end.

5. An apparatus for shaping elongated stock having a longitudinal axis comprising:
   stock support means for supporting elongated stock with the longitudinal axis in a first plane;
   a shaping member having a center along with a longitudinal axis thereof;
   positioning means for fixedly positioning said shaping member with the longitudinal axis thereof in a second plane which is in a fixed perpendicular relationship to said first plane, said positioning means including means for selectively positioning the longitudinal axis of said shaping member to be at a selected angle with respect to the longitudinal axis of said elongated stock;
   means for rotating said shaping member about the longitudinal axis thereof;
   means for engaging said stock with said shaping member to shape said elongated stock as a function of the engagement of the surface thereof with said shaping member; and
   means positioned adjacent said stock support means for displaying the length of said stock along its longitudinal axis from the center of said shaping member to a selected point of said stock.

6. The apparatus defined in claim 5 further including means in said stock support means for controllably rotating the elongated stock about its longitudinal axis to control the orientation of said stock with respect to said shaping member.

References Cited
UNITED STATES PATENTS 3,004,477  10/1961  Nielsen et al. _____ 90—15

FOREIGN PATENTS 1,161,080  3/1958  France.
406,841  12/1924  Germany.

WILLIAM W. DYER, JR., *Primary Examiner.*